(12) United States Patent
Lee et al.

(10) Patent No.: US 7,627,623 B2
(45) Date of Patent: Dec. 1, 2009

(54) INVERSE MODIFIED DISCRETE COSINE TRANSFORM (IMDCT) CO-PROCESSOR AND AUDIO DECODER HAVING THE SAME

(75) Inventors: Suk Ho Lee, Daejeon (KR); Nak Woong Eum, Daejeon (KR); Hee Bum Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 800 days.

(21) Appl. No.: 11/432,100

(22) Filed: May 11, 2006

(65) Prior Publication Data

US 2007/0050440 A1 Mar. 1, 2007

(30) Foreign Application Priority Data

Aug. 31, 2005 (KR) ...................... 10-2005-0080682

(51) Int. Cl.
*G06F 17/14* (2006.01)

(52) U.S. Cl. ...................................... 708/402
(58) Field of Classification Search ........................ None
See application file for complete search history.

(56) References Cited

U.S. PATENT DOCUMENTS

| | | | | | |
|---|---|---|---|---|---|
| 5,349,549 | A | * | 9/1994 | Tsutsui ........................ | 708/402 |
| 5,847,977 | A | * | 12/1998 | Jhung .......................... | 708/402 |
| 5,864,800 | A | * | 1/1999 | Imai et al. .................... | 704/229 |

(Continued)

FOREIGN PATENT DOCUMENTS

KR 1998-042631 8/1998

(Continued)

OTHER PUBLICATIONS

"Fast Time-Frequency Transform Algorithms and Their Applications to Real-Time Software Implementation of AC-3 Audio Codec," Yu-Chi Chen et. al, Journal of IEEE Transactions on Consumer Electronics, vol. 44, No. 2 (May 1998).

(Continued)

*Primary Examiner*—David H Malzahn
(74) *Attorney, Agent, or Firm*—Ladas & Parry LLP

(57) ABSTRACT

Provided are an IMDCT co-processor and an audio decoder having the same. The IMDCT co-processor includes: an input buffer for storing an input inverse-quantized frequency spectrum sample value; an I/Q separator for dividing the sample value stored in the input buffer into real data I and imaginary data Q; a first operation unit for performing complex-multiplication on the data divided by the I/Q separator and a given twiddle factor; an IFFT unit for performing an inverse fast Fourier transform on the operation result value of the first operation unit; a second operation unit for performing complex-multiplication on the result value from the IFFT unit and a given twiddle factor; a deinterleaver for receiving the operation result value from the second operation unit to arrange data and performing inverse-mapping on a positive value (+) and a negative value (−) of a certain portion of the data to each other to output a final IMDCT time sample value; and a control register for selecting the input inverse-quantized frequency spectrum sample value according to a given window sequence value to determine the final IMDCT time sample value.

13 Claims, 4 Drawing Sheets

U.S. PATENT DOCUMENTS

| | | | | |
|---|---|---|---|---|
| 6,209,015 B1 * | 3/2001 | Jhung | ......................... | 708/402 |
| 6,304,847 B1 * | 10/2001 | Jhung | ......................... | 704/500 |
| 2007/0027695 A1 * | 2/2007 | Oh et al. | ..................... | 704/500 |

FOREIGN PATENT DOCUMENTS

| KR | 1020000026948 A | 5/2000 |
|---|---|---|
| KR | 1020000050510 A | 8/2000 |

OTHER PUBLICATIONS

P. Duhamel, et al: "A Fast Algorithm For The Implementation of Filter Banks Based on Time Domain Aliasing Cancellation", Accoustics, Speech, and Signal Processing, 1991. ICASSP-91., 1991 Conference on, pp. 2209-2212, vol. 3.

* cited by examiner

FIG. 5 if N=2048, N=256,
(0-1023) (0-127)

─⟨1024-sample(k)⟩─────────────────

1024 – point
input sample  I ─⟨512-sample(N/2-2k-1)⟩─ (0-1023,1021,...3,1)
              Q ─⟨512-sample(2k)⟩─ (0,2,...,1020,1022)    $0 \le k \le \frac{N}{4}$ (512)
                ─⟨first twiddle factor⟩─
                ─⟨512-sampleI'⟩─
                ─⟨512-sampleQ'⟩─

─⟨512-point complex IFFT⟩─

─⟨512-sample i⟩─
                    ─⟨512-sample q⟩─
                    ─⟨second twiddle factor⟩─
                    ─⟨512-sample i'⟩─
                    ─⟨512-sample q'⟩─

0                    1023
yeven ─⟨                            ⟩─
                   ╲  ╱
                   -1*
                   ╱  ╲
          0                    1023
yodd  ─⟨                            ⟩─

0    511 512   1023 1024  1535 1536  2047
y={yeven,yodd}⟨            :            X            ⟩
                              2048-point
                              IMDCT output    *-1
deinterleaving   1536  2047 0  sample  1023 1024  1535
final output  ─⟨            :            X            ⟩─

INVERSE MODIFIED DISCRETE COSINE TRANSFORM (IMDCT) CO-PROCESSOR AND AUDIO DECODER HAVING THE SAME

CROSS-REFERENCE TO RELATED APPLICATION

This application claims priority to and the benefit of Korean Patent Application No. 2005-80682, filed on Aug. 31, 2005, the disclosure of which is incorporated herein by reference in its entirety.

BACKGROUND

1. Field of the Invention

The present invention relates to an inverse modified discrete cosine transform (IMDCT) co-processor and an audio decoder having the same and, more particularly, to an IMDCT co-processor in which an IMDCT of a filter bank block arranged at an output of an MPEG-4 audio decoder having a relatively great amount of computation is implemented in the form of a co-processor which includes a high speed operation unit and a small-sized memory, thereby reducing the whole computation amount of a digital signal processor (DSP) for decoding an audio signal, and an audio decoder having the same.

2. Discussion of Related Art

In general, an analog signal is converted into a digital signal and then into a frequency band signal to reduce the amount of data without signal loss, and a signal of a time domain x(t) is converted into a signal of a frequency domain X(f) for efficient signal processing.

A conventional MPEG-4 audio encoder employs a modified discrete cosine transform (MDCT) device to provide time-to-frequency domain mapping. The MDCT device divides input signals into different frequency bands and then processes them. In contrast, a conventional MPEG-4 audio decoder employs an IMDCT device for frequency-to-time conversion to reproduce a signal even at a high frequency band almost perfectly.

The IMDCT device employed in the MPEG-4 audio decoder is defined by Equation 1. The IMDCT receives 1024 frequency spectrum sample values and outputs 2048 time domain sample values if the window sequence is of the long block type, and receives 128 frequency spectrum sample values and outputs 256 time domain sample values if the window sequence is of the short block type.

$$x[n] = \frac{2}{N} \sum_{k=0}^{\frac{N}{2}-1} X[k] \cos\left(\frac{2\pi}{N}(n+n_0)\left(k+\frac{1}{2}\right)\right),$$

Equation 1 for $0 \le k < \frac{N}{2},$ $0 \le n < N,$ $(N = 2048, 256)$ where n denotes a time domain sample index, k denotes a frequency spectrum sample index, N denotes the window length (2048, 256) based on the window sequence, and $n_0 = (N/2+1)/2$.

An encoded audio stream input to the conventional MPEG-4 audio decoder is subjected to decoding, inverse quantization, noise filtering, and stereo processing in this order, and then subjected to frequency-to-time conversion at an IMDCT filter bank, and finally output as a voice signal through a codec.

However, the conventional MPEG-4 audio decoder has disadvantages in that it essentially needs a high performance digital signal processor (DSP), and a clock frequency of the DSP is raised by an increment of million instructions per second (MIPS) due to a great amount of computation. Thus, it is not suitable for a mobile multimedia environment that requires low power consumption.

SUMMARY OF THE INVENTION

The present invention is directed to an IMDCT co-processor in which an IMDCT of a filter bank block arranged at an output of an MPEG-4 audio decoder having a relatively greater amount of computation is implemented as a co-processor having a high speed operation unit and a small-sized memory to thereby reduce the whole computation amount of a digital signal processor (DSP) for decoding an audio signal, the MIPS, and a decoding time, whereby it is suitable for a mobile multimedia environment which requires low power consumption, and an audio decoder having the same.

One aspect of the present invention is to provide an IMDCT co-processor, including: an input buffer for storing an input inverse-quantized frequency spectrum sample value; an I/Q separator for dividing the sample value stored in the input buffer into real data I and imaginary data Q; a first operation unit for performing complex-multiplication on the data divided by the I/Q separator and a given twiddle factor; an IFFT unit for performing an inverse fast Fourier transform on the operation result value from the first operation unit; a second operation unit for performing complex-multiplication on the result value from the IFFT unit and a given twiddle factor; a deinterleaver for receiving the operation result value from the second operation unit to arrange data and performing inverse-mapping on a positive value (+) and a negative value (−) of a certain portion of the data to each other to output a final IMDCT time sample value; and a control register for selecting the input inverse-quantized frequency spectrum sample value according to a given window sequence value to determine the final IMDCT time sample value.

Another aspect of the present invention is to provide an audio decoder, including: a digital signal processor for decoding and inverse-quantizing an encoded audio stream using a given program; an IMDCT co-processor for performing a frequency-to-time mapping on the data decoded and inverse-quantized by the digital signal processor; a memory-mapped register for storing data obtained by the digital signal processor performing an overlap-addition process on the data from the IMDCT co-processor; and a codec interface for connecting the data stored in the memory-mapped register to a codec for outputting an original audio signal.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 5 is a timing diagram illustrating the whole operation of the IMDCT co-processor of FIG. 2.

DETAILED DESCRIPTION OF PREFERRED EMBODIMENTS

Hereinafter, an exemplary embodiment of the present invention will be described in detail. However, the present invention is not limited to the embodiments disclosed below, but can be implemented in various types. Therefore, the present embodiment is provided for complete disclosure of the present invention and to fully inform the scope of the present invention to those ordinarily skilled in the art.

Figure 1:
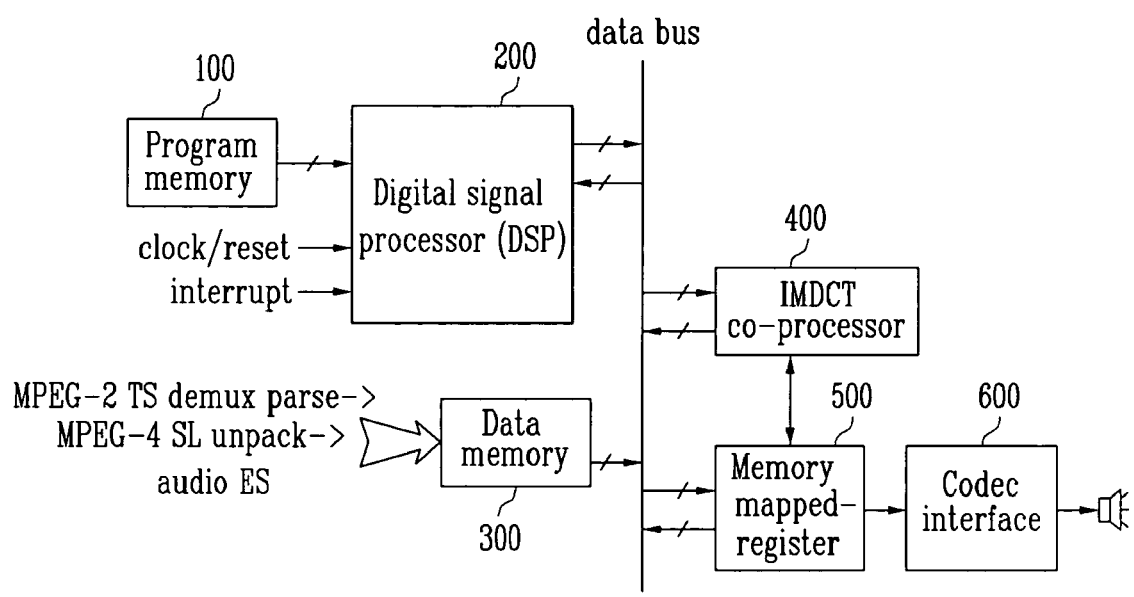
FIG. 1 is a block diagram of an audio decoder having an IMDCT co-processor according to an exemplary embodiment of the present invention.
Figure 2:
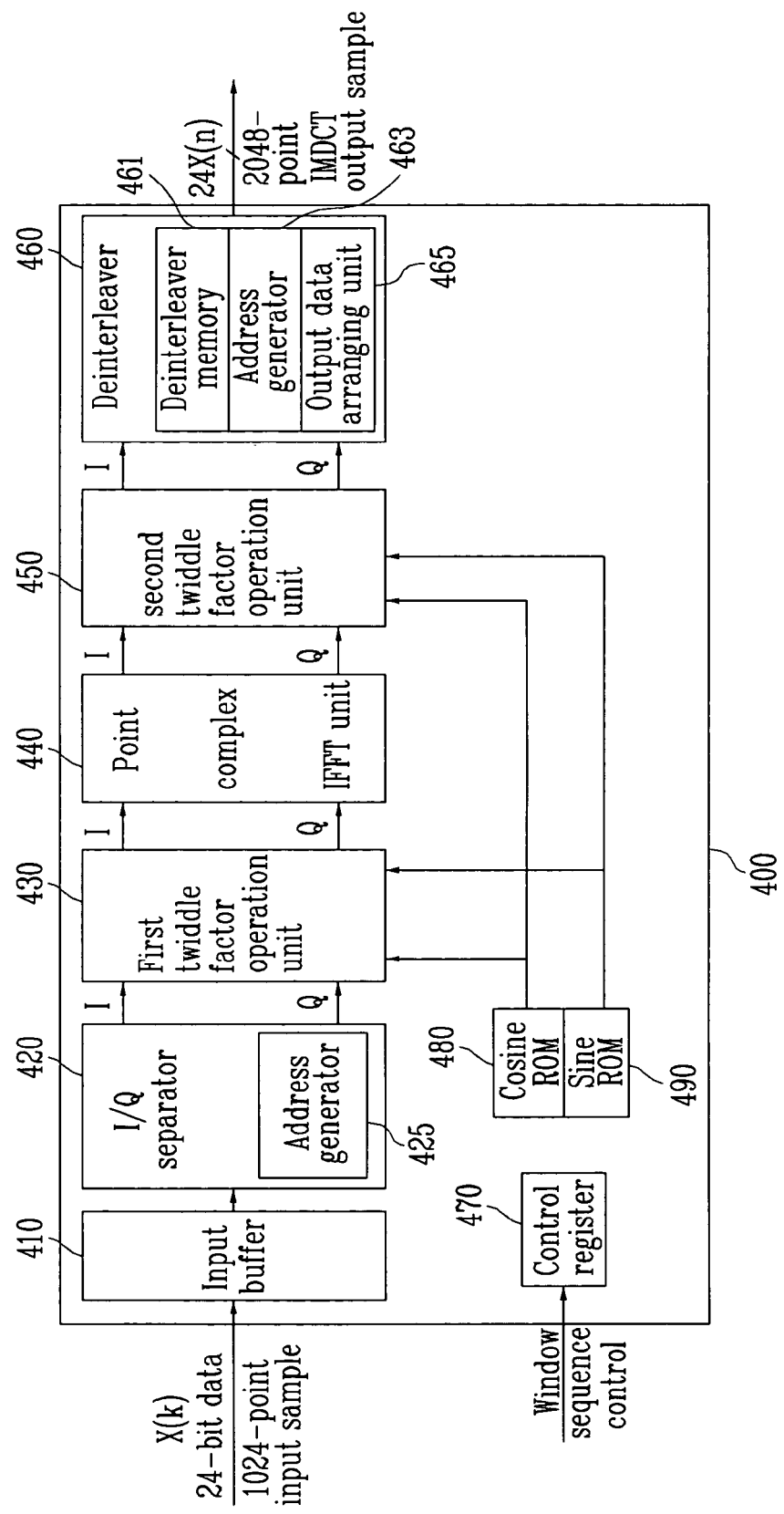
FIG. 2 is a block diagram specifically illustrating the IMDCT of FIG. 1

FIG. 1 is a block diagram of an audio decoder having an IMDCT co-processor according to an exemplary embodiment of the present invention. FIG. 2 is a block diagram specifically illustrating the IMDCT co-processor of FIG. 1.

Referring to FIGS. 1 and 2, the audio decoder having an IMDCT co-processor according to an embodiment of the present invention includes a program memory 100, a digital signal processor (DSP) 200, a data memory 300, an IMDCT co-processor 400, a memory-mapped register (MMR) 500, and a codec interface 600.

The program memory 100 stores a specific program for performing, for example, an MPEG-4 audio decoding process.

The digital signal processor 200 receives, for example, an encoded audio stream stored in the data memory 300 and decodes and inverse-quantizes the encoded audio stream using the specific program stored in the program memory 100.

The digital signal processor 200 receives data output from the IMDCT co-processor 400, performs an overlap-addition process on the data and outputs the result to the memory-mapped register 500. Typically, the overlap-addition process overlaps a neighboring block to filter a noise between blocks of output data.

The data memory 300 stores, for example, encoded audio stream data of an MPEG-2 TS demux parse or an MPEG-4 SL unpack audio ES. Here, the data stored in the data memory 300 are preferably decoded in a frame unit by the DSP 200.

The IMDCT co-processor 400 receives decoded and inverse-quantized data from the DSP processor 200 to perform frequency-to-time mapping on the data. As shown in FIG. 2, the IMDCT co-processor 400 includes an input buffer 410, an I/Q separator 420, a first twiddle factor operation unit 430, a point complex inverse fast Fourier transform (IFFT) unit 440, a second twiddle factor operation unit 450, a deinterleaver 460, and a control register 470.

The input buffer 410 stores decoded and inverse-quantized frequency spectrum sample values output from the DSP 200.

The I/Q separator 420 separates the sample values stored in the input buffer 410 into real data I and imaginary data Q. The I/Q separator 420 may have an address generator 425 therein for generating an output address sequence of the input buffer 410.

The first twiddle factor operation unit 430 performs complex-multiplication operation on the separated data from the I/Q separator 420 and a specific twiddle factor.

The point complex IFFT unit 440 performs inverse fast Fourier transform on the operation result from the first twiddle factor operation unit 430 and outputs the result value to the second twiddle factor operation unit 450.

The second twiddle factor operation unit 450 performs complex-multiplication operation on the result value from the point complex IFFT unit 440 and a specific twiddle factor, like the first twiddle factor operation unit 450.

The deinterleaver 460 receives the operation result value from the second twiddle factor operation unit 450 to arrange the data and performs inverse-mapping of a positive value (+) of a specific portion to a negative value (−) and of a negative value (−) to a positive value (+) to output final IMDCT time sample values.

The deinterleaver 460 includes a deinterleaver memory 461 for storing the operation result value from the second twiddle factor operation unit 450, an address generator 463 for generating an output address of the deinterleaver memory 461, and an output data arranging unit 465 for arranging output data at an output terminal.

The control register 470 selects the inverse-quantized frequency spectrum sample value output from the DSP 200 depending on a specific window sequence to determine the final IMDCT time sample values.

Here, cosine values and sine values of the first and second twiddle factor operation units 430 and 450 are preferably stored in a cosine ROM 480 and a sine ROM 490, respectively, and are read out if needed.

The memory-mapped register 500 stores the data obtained by the DSP 200 performing the overlap-addition process on the data from the IMDCT co-processor 400.

The codec interface 600 connects the data stored in the memory-mapped register 500 to a codec for outputting an original audio signal.

An operation process in the IMDCT co-processor having the above-described structure according to the present invention will be described in detail.

Figure 3:
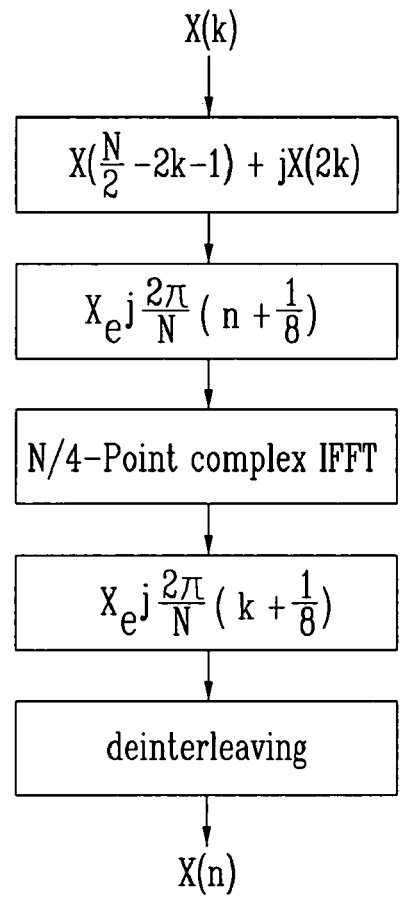
FIG. 3 is a flow diagram illustrating an operation process of the IMDCT co-processor of FIG. 2.
Figure 4:
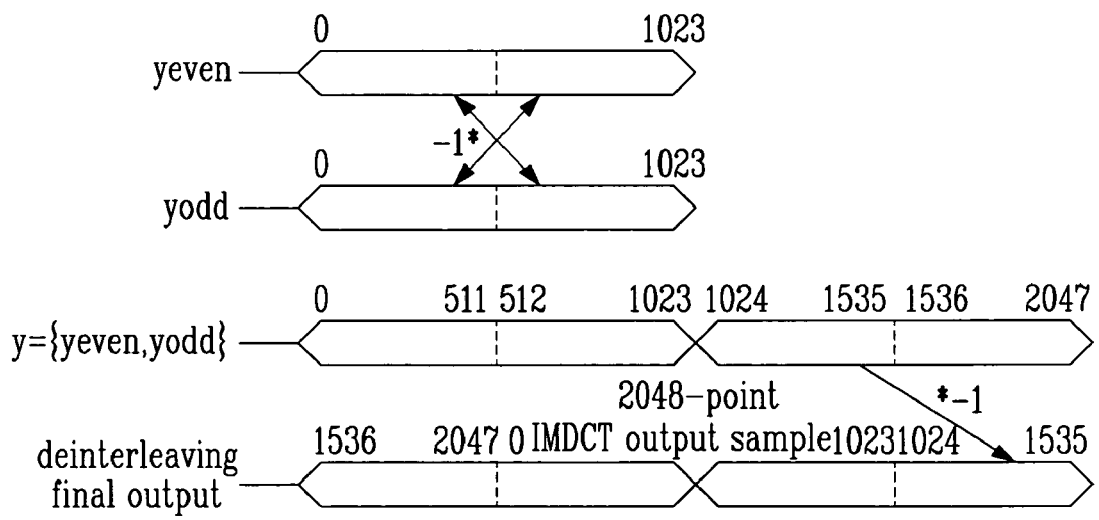
FIG. 4 is a timing diagram specifically illustrating an interleaving process of FIG. 3.

FIG. 3 is a flow diagram illustrating an operation process in the IMDCT co-processor of FIG. 2, FIG. 4 is a timing diagram illustrating an interleaving process of FIG. 3, and FIG. 5 is a timing diagram illustrating the whole operation of the IMDCT co-processor of FIG. 2.

Referring to FIGS. 3 to 5, for example 1024 or 128 frequency spectrum sample values X(k) decoded and inverse-quantized by the digital signal processor 200 are stored in the input buffer 410, and sample values X(k) sequentially stored in the input buffer 410 are divided into real data I and imaginary data Q by the I/Q separator 420 according to Equation 2 and output. Here, the address generator 425 in the I/Q separator 420 is an output address generator for the input buffer 410 for generating an address sequence according to Equation 2.

$$X\left(\frac{N}{2} - 2k - 1\right) + 1jX(2k) \text{ for } 0 \leq k < \frac{N}{2} \qquad \text{Equation 2}$$

where k denotes a frequency spectrum sample index, and N denotes the window length (2048, 256) based on the window sequence.

The first twiddle factor operation unit 430 performs complex-multiplication operation on the respective real and imaginary data I and Q separated by the I/Q separator 420 and a specific twiddle factor according to Equation 3.

$$e^{j\frac{2\pi}{N}\left(n+\frac{1}{8}\right)} = \cos\left(\frac{2\pi}{N}\left(n+\frac{1}{8}\right)\right) + j\sin\left(\frac{2\pi}{N}\left(n+\frac{1}{8}\right)\right), \qquad \text{Equation 3}$$

for $$0 \leq n < \frac{N}{4}$$

$$(N = 2048, 256)$$

where n denotes a time domain sample index, and N denotes the window length (2048, 256) based on the window sequence.

Next, the point complex IFFT unit 440 performs the IFFT on the operation result value received from the first twiddle factor operation unit 430. Here, the IFFT is the N/4-point (i.e., 512-point or 64-point) complex IFFT using the specific window sequence value (N=2048 or 256).

Thereafter, the second twiddle factor operation unit 450 performs the complex-multiplication on the result value received from the point complex IFFT unit 440 and a specific twiddle factor according to Equation 4.

$$e^{j\frac{2\pi}{N}(k+\frac{1}{8})} = \cos\left(\frac{2\pi}{N}\left(k+\frac{1}{8}\right)\right) + j\sin\left(\frac{2\pi}{N}\left(k+\frac{1}{8}\right)\right), \quad \text{Equation 4}$$

for $$0 \leq k < \frac{N}{4}$$

$$(N = 2048, 256)$$

where k denotes a frequency spectrum sample index, and N denotes the window length (2048, 256) based on the window sequence.

The deinterleaver 460 receives the operation result value from the second twiddle factor operation unit 450 to arrange data according to Equation 5, performs 1:1-mapping of a value of Y[m] to a value of x[n] according to Equation 6, and outputs the same result as the final IMDCT time sample value (2048 or 256) according to Equation 7.

$$Yeven[m] = Re\{IFFT[m]\} \text{ for } 0 \leq m < N/4$$

$$Yeven[N/4+m] = Im\{IFFT[m]\} \text{ for } 0 \leq m < N/4$$

$$Yodd[m] = (-1)(Yeven[N/2-m-1]) \text{ for } 0 \leq m < N/2 \quad \text{Equation 5}$$

where m denotes a frequency spectrum sample index, N denotes the window length (2048, 256) based on the window sequence, Yeven denotes an even sample value, Yodd denotes an odd sample value, and Y[m] (Yeven, Yodd) denotes an intermediate sample value produced by an operation process of the first operation unit.

$$x[n] \text{ for } 0 \leq n < N/4 = Y[m] \text{ for } 3N/4 \leq m < N \quad \text{Equation 6}$$
$$x[n] \text{ for } N/4 \leq n < 3N/4 = Y[m] \text{ for } 0 \leq m < N/2$$
$$x[n] \text{ for } 3N/4 \leq n < N = (-1)Y[m] \text{ for } N/2 \leq m < 3N/4$$

$$x[n] = \frac{2}{N}\sum_{k=0}^{\frac{N}{2}-1} X[k]\cos\left(\frac{2\pi}{N}(n+n_0)\left(k+\frac{1}{2}\right)\right), \quad \text{Equation 7}$$

for $$0 \leq k < \frac{N}{2},$$
$$0 \leq n < N,$$
$$(N = 2048, 256)$$

where x[n] denotes a final IMDCT time sample value, and Y[m] denotes an intermediate sample value produced by an operation process of the first operation unit.

In other words, the deinterleaver 460 arranges the operation result value from the second twiddle factor operation unit 450 to obtain final 2048 or 256 IMDCT time sample values, and inversely maps a positive value (+) of a specific portion of the data to a negative value (−) and a negative value (−) to a positive value (+).

The control register 470 determines whether the IMDCT co-processor 400 outputs the 2048 or 256 sample values or not depending on the specific window sequence value (N=2048 or 256).

If the 2048 sample values are output from the IMDCT co-processor 400, the second twiddle factor operation unit 450 outputs the 512 sample values of respective real and imaginary data I and Q as the operation result.

The real data I and the imaginary data Q have the 1024 even sample values within an output range (0≦k<N) of the whole IMDCT, the real data I having 512 even sample values Xeven within a range of 0≦k<N/2 and the imaginary data Q having 512 even sample values Xeven within a range of N/2≦k<N.

Also, remaining 1024 odd sample values Xodd in the range of 0≦k<N are obtained by multiplying −1 by the 1024 even sample values Xeven within a range of 0≦k<N and then reversing them right and left. Finally, the 2048 sample values x[k] are obtained by combining the even sample values Xeven and the odd sample values Xodd. This procedure is expressed by Equation 5.

After performing the above-described processing, data are arranged again to obtain the same IMDCT result as Equation 7, and the Y[m] value is mapped to the x[n] value in one-to-one correspondence using Equation 6. Meanwhile, the same procedure is performed even in the case where 256 sample values are output from the IMDCT co-processor 400.

As described above, the present invention implements an IMDCT of a filter bank block arranged at an output of an MPEG-4 audio decoder having a relatively greater amount of computation as a co-processor including a high speed operation unit and a small-sized memory to thereby reduce a whole computation amount of a digital signal processor (DSP) for decoding an audio signal, the MIPS, and a decoding time, whereby it is possible to implement the MPEG-4 audio decoder suitable for a mobile multimedia environment which requires low power consumption.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An inverse modified discrete cosine transform (IMDCT) co-processor, comprising:
   an input buffer for storing an input inverse-quantized frequency spectrum sample value;
   an I/Q separator for dividing the sample value stored in the input buffer into real data I and imaginary data Q;
   a first operation unit for performing complex-multiplication operation on the data divided by the I/Q separator and a given twiddle factor;
   an IFFT unit for performing an inverse fast Fourier transform on the operation result value from the first operation unit;
   a second operation unit for performing complex-multiplication operation on the result value from the IFFT unit and a given twiddle factor;
   a deinterleaver for receiving the operation result value from the second operation unit to arrange the data and inverse-mapping a positive value (+) and a negative value (−) of a certain portion of the data to each other to output a final IMDCT time sample value; and
   a control register for selecting the input inverse-quantized frequency spectrum sample value according to a given window sequence value to determine the final IMDCT time sample value.

2. The IMDCT co-processor of claim 1, wherein the I/Q separator separates the sample value stored in the input buffer into the real data I and the imaginary data Q according to Equation 8:

$$X\left(\frac{N}{2} - 2k - 1\right) + jX(2k) \text{ for } 0 \le k < \frac{N}{2} \qquad \text{Equation 8}$$

where k denotes a frequency spectrum sample index, and N denotes the window length (2048, 256) based on the window sequence.

3. The IMDCT co-processor of claim 2, further comprising an address generator positioned in the I/Q separator for generating an output address sequence for the input buffer according to Equation 8.

4. The IMDCT co-processor of claim 1, wherein the first operation unit performs complex-multiplication on the data and the given twiddle factor according to Equation 9:

$$e^{j\frac{2\pi}{N}\left(n+\frac{1}{8}\right)} = \cos\left(\frac{2\pi}{N}\left(n+\frac{1}{8}\right)\right) + j\sin\left(\frac{2\pi}{N}\left(n+\frac{1}{8}\right)\right), \qquad \text{Equation 9}$$

for $$0 \le n < \frac{N}{4}$$

$$(N = 2048, 256)$$

where n denotes a time domain sample index, and N denotes the window length (2048, 256) based on the window sequence.

5. The IMDCT co-processor of claim 1, wherein the second operation unit performs complex-multiplication on the result value and the given twiddle factor according to Equation 10:

$$e^{j\frac{2\pi}{N}\left(k+\frac{1}{8}\right)} = \cos\left(\frac{2\pi}{N}\left(k+\frac{1}{8}\right)\right) + j\sin\left(\frac{2\pi}{N}\left(k+\frac{1}{8}\right)\right), \qquad \text{Equation 10}$$

for $$0 \le k < \frac{N}{4}$$

$$(N = 2048, 256)$$

where k denotes a frequency spectrum sample index, and N denotes the window length (2048, 256) based on the window sequence.

6. The IMDCT co-processor of claim 4 or 5, wherein the cosine value and sine value are stored in a separated cosine ROM and a sine ROM, respectively, and are read out if needed.

7. The IMDCT co-processor of claim 1, wherein the IFFT performed by the IFFT unit includes an N/4-point (i.e., 512-point or 64-point) complex IFFT using the specific window sequence value (N=2048 or 256).

8. The IMDCT co-processor of claim 1, wherein the final IMDCT time sample value output from the deinterleaver is 2048 or 256.

9. The IMDCT co-processor of claim 1, wherein the deinterleaver arranges the data according to Equation 11:

$$Yeven[m] = \text{Re}\{IFFT[m]\} \text{ for } 0 \le m < N/4$$

$$Yeven[N/4+m] = \text{Im}\{IFFT[m]\} \text{ for } 0 \le m < N/4$$

$$Yodd[m] = (-1)(Yeven[N/2-m-1]) \text{ for } 0 \le m < N/2 \qquad \text{Equation 11}$$

where m denotes a frequency spectrum sample index, N denotes a window length (2048, 256) based on a window sequence, Xeven denotes an even sample value, Xodd denotes an odd sample value, and Y[m](Yeven,Yodd) denotes an intermediate sample value produced by an operation process of the first operation unit.

10. The IMDCT co-processor of claim 9, wherein thee deinterleaver maps a value of Y[m] to a value of x[n] according to Equation 12 in one-to-one mapping and outputs the same result as the final IMDCT time sample values (2048 or 256) according to Equation 13:

$$x[n] \text{ for } 0 \le n < N/4 = Y[m] \text{ for } 3N/4 \le m < N \qquad \text{Equation 12}$$
$$x[n] \text{ for } N/4 \le n < 3N/4 = Y[m] \text{ for } 0 \le m < N/2$$
$$x[n] \text{ for } 3N/4 \le n < N = (-1)Y[m] \text{ for } N/2 \le m < 3N/4;$$

and $$x[n] = \frac{2}{N} \sum_{k=0}^{\frac{N}{2}-1} X[k]\cos\left(\frac{2\pi}{N}(n+n_0)\left(k+\frac{1}{2}\right)\right), \qquad \text{Equation 13}$$

for $$0 \le k < \frac{N}{2},$$
$$0 \le n < N,$$
$$(N = 2048, 256)$$

where x[n] denotes a final IMDCT time sample value, and Y[m] denotes an intermediate sample value produced by an operation process of the first operation unit.

11. The IMDCT co-processor of claim 1, wherein the deinterleaver includes:
  a memory for storing the operation result value from the second operation unit,
  an address generator for generating an output address of the memory, and
  an output data arranging unit for arranging the output data at a final output terminal.

12. An audio decoder, comprising:
  a digital signal processor for decoding and inverse-quantizing an encoded audio stream using a specific program;
  an IMDCT co-processor of claim 1 for performing frequency-to-time mapping on the data decoded and inverse-quantized by the digital signal processor;
  a memory-mapped register for storing data obtained by the digital signal processor performing an overlap-addition process on the data produced by the IMDCT co-processor; and
  a codec interface for connecting the data stored in the memory-mapped register to a codec for outputting an original audio signal.

13. The audio decoder of claim 12, wherein the encoded audio stream is stored in a separate memory and is decoded in a frame unit by the digital processor.

* * * * *